US008596598B2

(12) United States Patent
Lai et al.

(10) Patent No.: US 8,596,598 B2
(45) Date of Patent: Dec. 3, 2013

(54) TABLE WITH TELESCOPIC LEGS

(76) Inventors: Yu-Shan Lai, Chiayi (TW); Yen-Chuan Lai, Chiayi (TW)

( * ) Notice: Subject to any disclaimer, the term of this patent is extended or adjusted under 35 U.S.C. 154(b) by 291 days.

(21) Appl. No.: 13/017,271

(22) Filed: Jan. 31, 2011

(65) Prior Publication Data

US 2012/0193501 A1 Aug. 2, 2012

(51) Int. Cl.

| | |
|---|---|
| ***F16M 13/00*** | (2006.01) |
| ***F16M 11/24*** | (2006.01) |
| ***A47B 91/00*** | (2006.01) |
| ***A47B 9/00*** | (2006.01) |
| ***A47B 9/20*** | (2006.01) |

(52) U.S. Cl.
USPC ..................... 248/423; 248/125.8; 248/188.2; 248/188.3; 248/188.8; 108/146; 108/147.21

(58) Field of Classification Search
USPC .................... 248/423, 354.5, 221.11, 221.12, 248/222.11, 223.41, 224.61, 224.51, 224.8, 248/125.8, 407, 188.8, 188.2, 188.3; 108/146, 147.19, 147.21, 144.11
See application file for complete search history.

(56) References Cited

U.S. PATENT DOCUMENTS

| | | | | |
|---|---|---|---|---|
| 4,247,216 | A * | 1/1981 | Pansini | 403/109.3 |
| 4,645,162 | A * | 2/1987 | Roy et al. | 248/439 |
| 5,171,052 | A * | 12/1992 | Cunningham | 294/210 |
| 6,082,922 | A * | 7/2000 | Cheng | 403/102 |
| 6,173,660 | B1 * | 1/2001 | Emmert | 108/90 |
| 6,263,895 | B1 * | 7/2001 | Bang | 135/138 |
| 6,461,002 | B1 * | 10/2002 | Su | 353/119 |
| 6,837,545 | B1 * | 1/2005 | Ho | 297/411.36 |
| 6,896,333 | B1 * | 5/2005 | Matern et al. | 297/411.36 |
| 6,957,867 | B1 * | 10/2005 | Su | 297/411.36 |
| 7,413,366 | B2 * | 8/2008 | Bensussan | 403/109.2 |
| 7,441,733 | B2 * | 10/2008 | Chen et al. | 248/125.8 |
| 7,467,769 | B2 * | 12/2008 | Shao et al. | 248/188.2 |
| 7,980,632 | B2 * | 7/2011 | Pai | 297/411.36 |
| 8,485,488 | B2 * | 7/2013 | Forrest et al. | 248/408 |
| 2005/0078283 | A1 * | 4/2005 | Lee et al. | 353/119 |
| 2006/0113440 | A1 * | 6/2006 | Chung et al. | 248/188.2 |
| 2009/0121099 | A1 * | 5/2009 | Chou | 248/188.2 |
| 2010/0002203 | A1 * | 1/2010 | Ruan | 353/119 |

* cited by examiner

*Primary Examiner* — Jonathan Liu
*Assistant Examiner* — Chiedu Chibogu
(74) *Attorney, Agent, or Firm* — Alan Kamrath; Kamrath IP Lawfirm, P.A.

(57) ABSTRACT

A booster structure of legs contains a support plate including four posts disposed at four corners of a bottom end thereof respectively. Each post includes a plurality of recesses having a vertical sliding section and a number of horizontal retaining sections perpendicular to the vertical sliding section. Each of a plurality of vertical moving units, including includes an inner stem and an outer stem, with the outer stem including a bottom cover. A bolt element is inserted and slides between the inner and outer stems. The bolt element includes a straight sliding section and a number of engaging sections perpendicular to the straight sliding section and includes a resilient element, a button, and a lip. The button is disposed on one side of the outer stem so that the bolt element is forced by the button to slide horizontally and return to its original position.

2 Claims, 6 Drawing Sheets

TABLE WITH TELESCOPIC LEGS

BACKGROUND OF THE INVENTION

1. Field of the Invention

The present invention relates to a booster structure of legs and, more particularly, to a booster structure of legs to enhance a support plate thereof.

2. Description of the Prior Art

A conventional booster structure of legs is used to help a user to enter a booster of vehicles at a higher position and includes a support plate having an upper plane and a lower plane. The upper plane and the lower plane are flat. However, such a booster structure can not adjust its height based on a desired height.

The present invention has arisen to mitigate and/or obviate the afore-described disadvantages.

SUMMARY OF THE INVENTION

The primary objective of the present invention is to provide a booster structure of legs capable of overcoming the shortcomings of the conventional booster structure of legs.

Another objective of the present invention is to provide a booster structure of legs capable of being retracted. The vertical moving unit is moved toward a desired height smoothly by pressing the button to be further fixed at multi-section positions with the post, operating the booster structure of the legs easily.

To obtain the above objectives, a booster structure of legs provided by the present invention contains a support plate including four posts disposed at four corners of a bottom end thereof respectively to be retracted. Each post includes a plurality of recesses fixed on predetermined side surfaces thereof, and each recess includes a vertical sliding section and a number of horizontal retaining sections perpendicular to the vertical sliding section. Each of a plurality of vertical moving units includes an inner stem and an outer stem. The outer stem includes a bottom cover arranged on a bottom end thereof so that the outer and inner stems slide to cover the post. A bolt element is inserted and slides between the inner and outer stems. The bolt element includes a straight sliding section and a number of engaging sections perpendicular to the straight sliding section so that the bolt element engages with and slides in the plurality of recesses correspondingly in a multi-section engaging and sliding manner. The bolt element includes a resilient element and a button fixed on one end thereof. A lip is secured on one side of the outer stem to cover the outer stem. The button is disposed on another side of the outer stem so that the bolt element is forced by the button to slide horizontally and return to its original position.

DETAILED DESCRIPTION OF THE PREFERRED EMBODIMENTS

The present invention will be clearer from the following description when viewed together with the accompanying drawings, which show, for purpose of illustration only, the preferred embodiments in accordance with the present invention.

Figure 1:
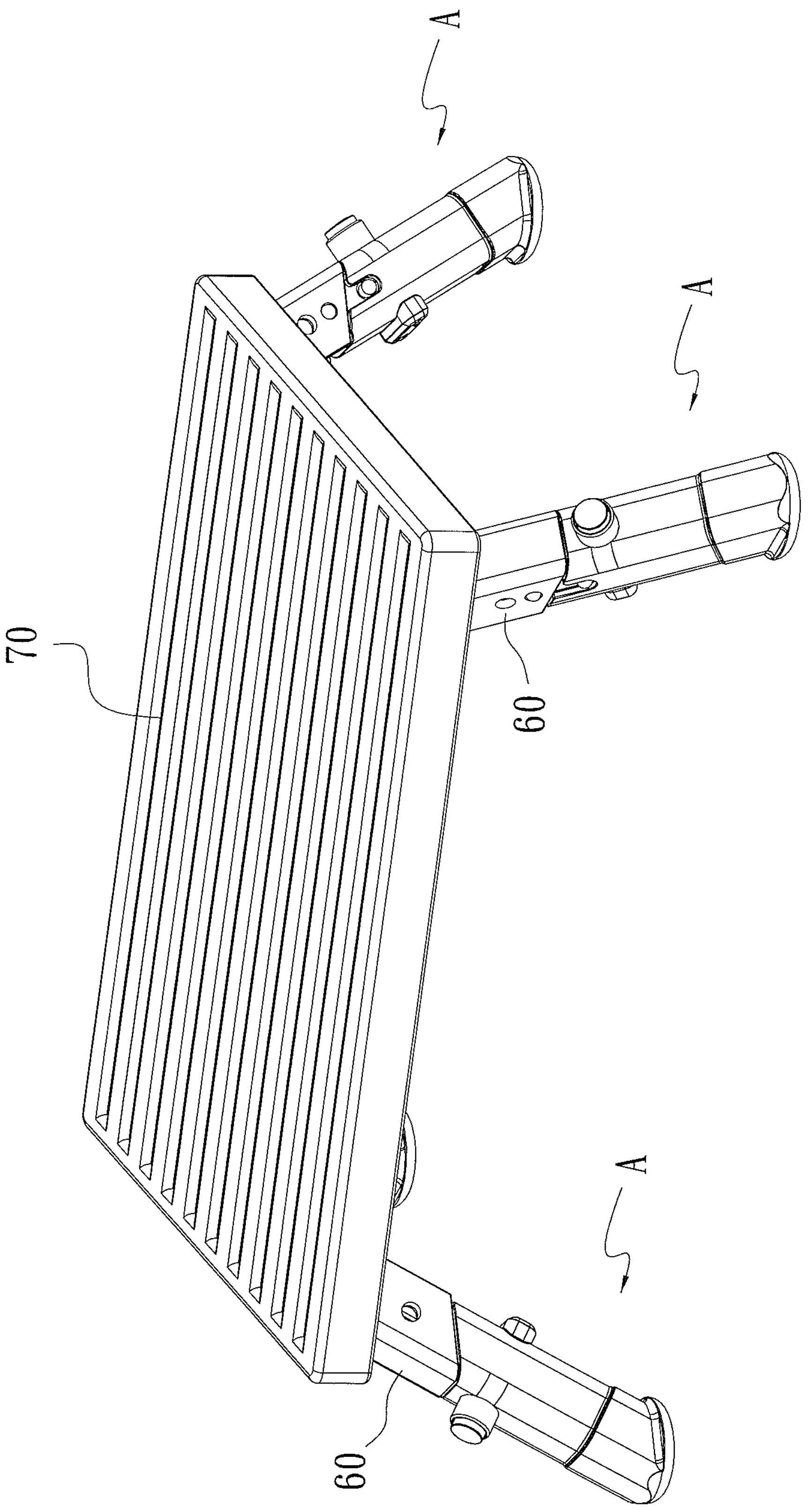
FIG. 1 is a perspective view showing the assembly of a support plate and a plurality of vertical moving units of a booster structure of legs according to a preferred embodiment of the present invention.
Figure 2:
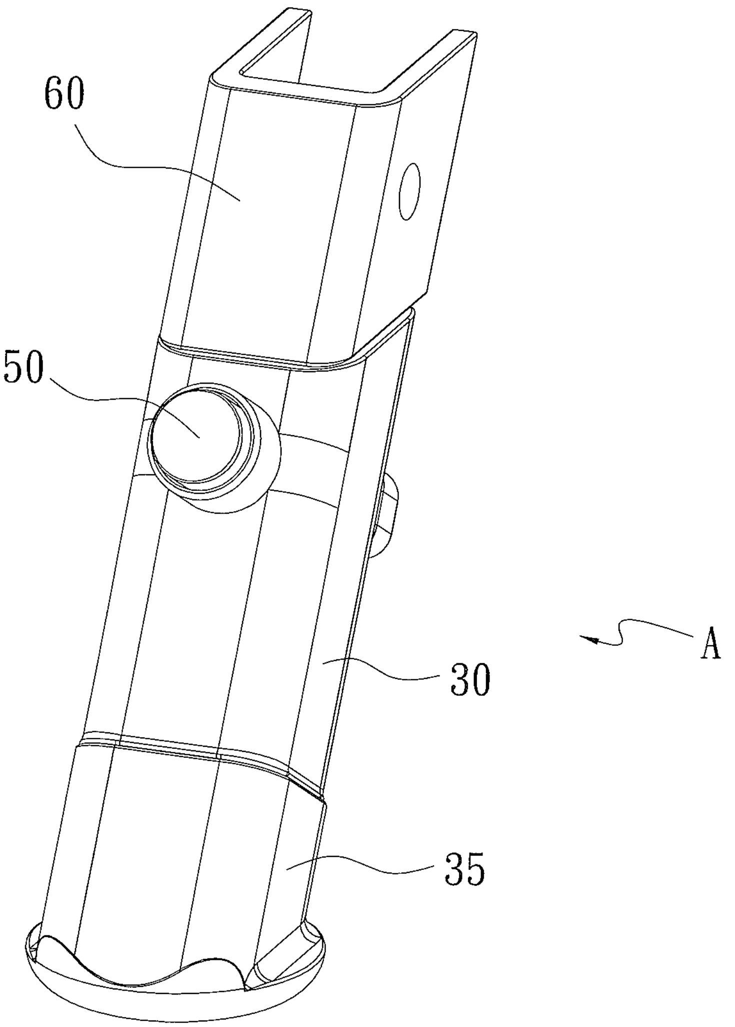
FIG. 2 is a perspective view showing the assembly of a post and the vertical moving unit of the booster structure of the legs according to the preferred embodiment of the present invention.
Figure 3:
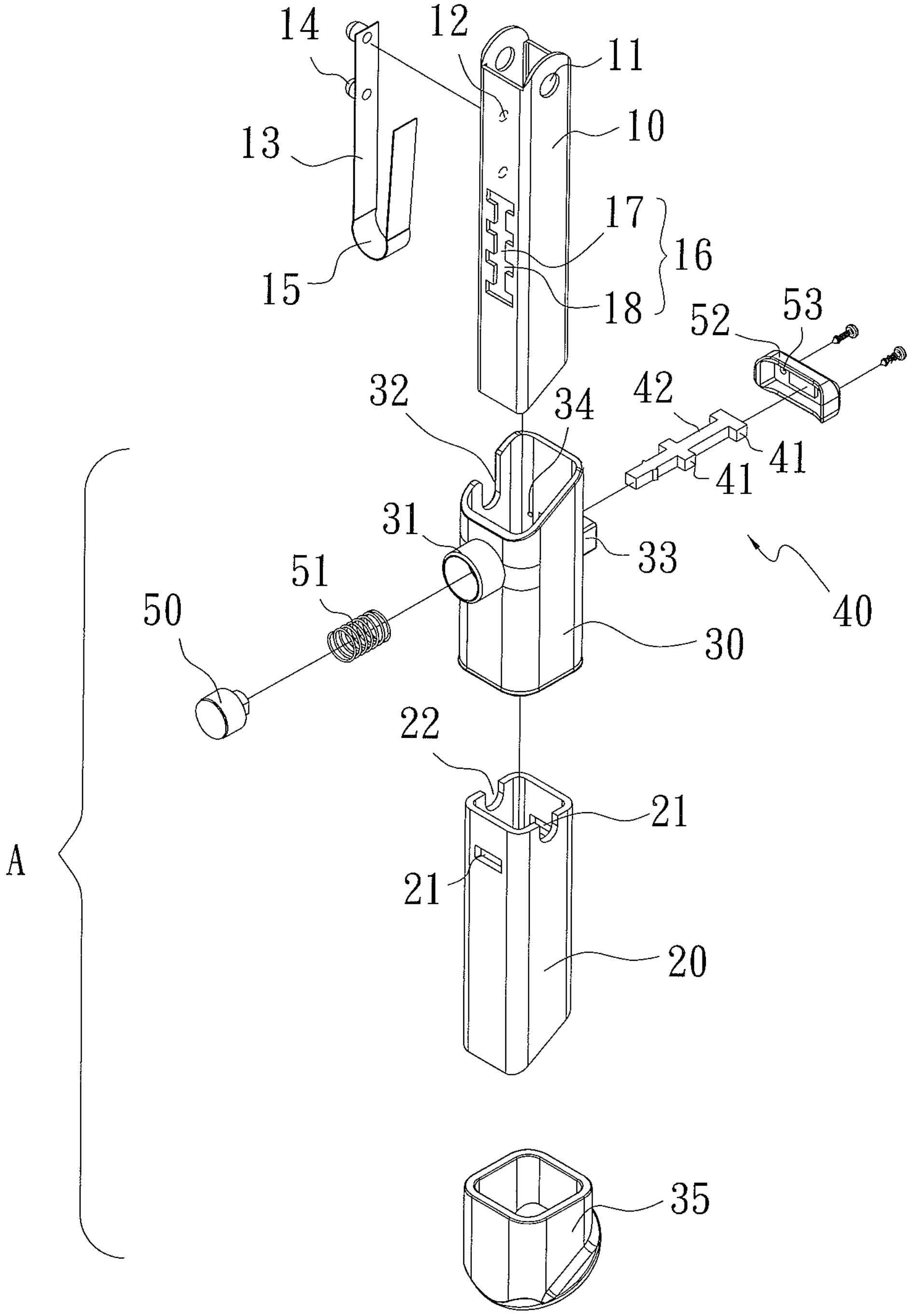
FIG. 3 is a perspective view showing the exploded components of the post and the vertical moving unit of the booster structure of the legs according to the preferred embodiment of the present invention.
Figure 4:
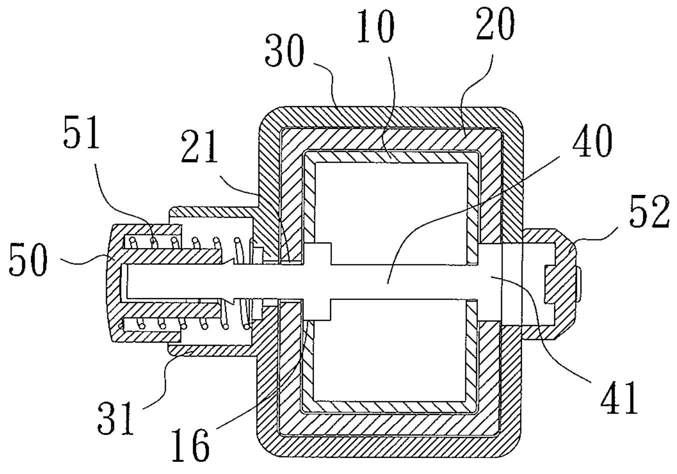
FIG. 4 is a cross sectional view showing the operation of the post and the vertical moving unit of the booster structure of the legs according to the preferred embodiment of the present invention.
Figure 5:
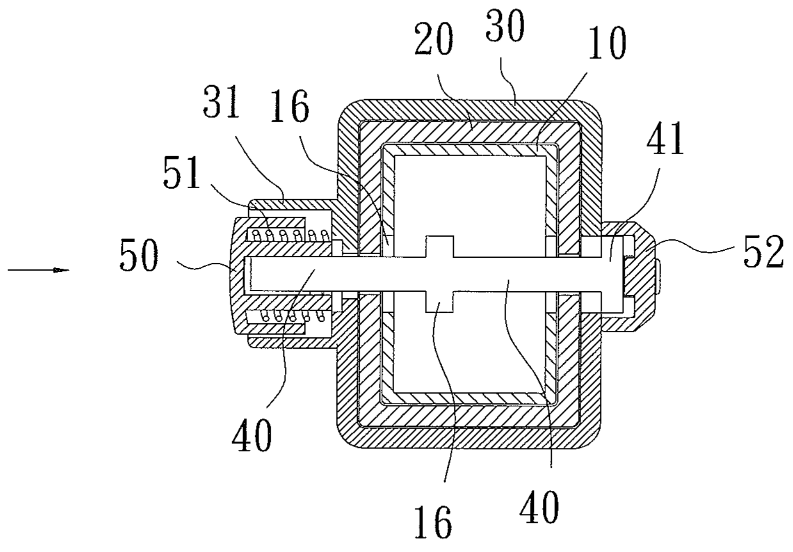
FIG. 5 is another cross sectional view showing the operation of the post and the vertical moving unit of the booster structure of the legs according to the preferred embodiment of the present invention.
Figure 6:
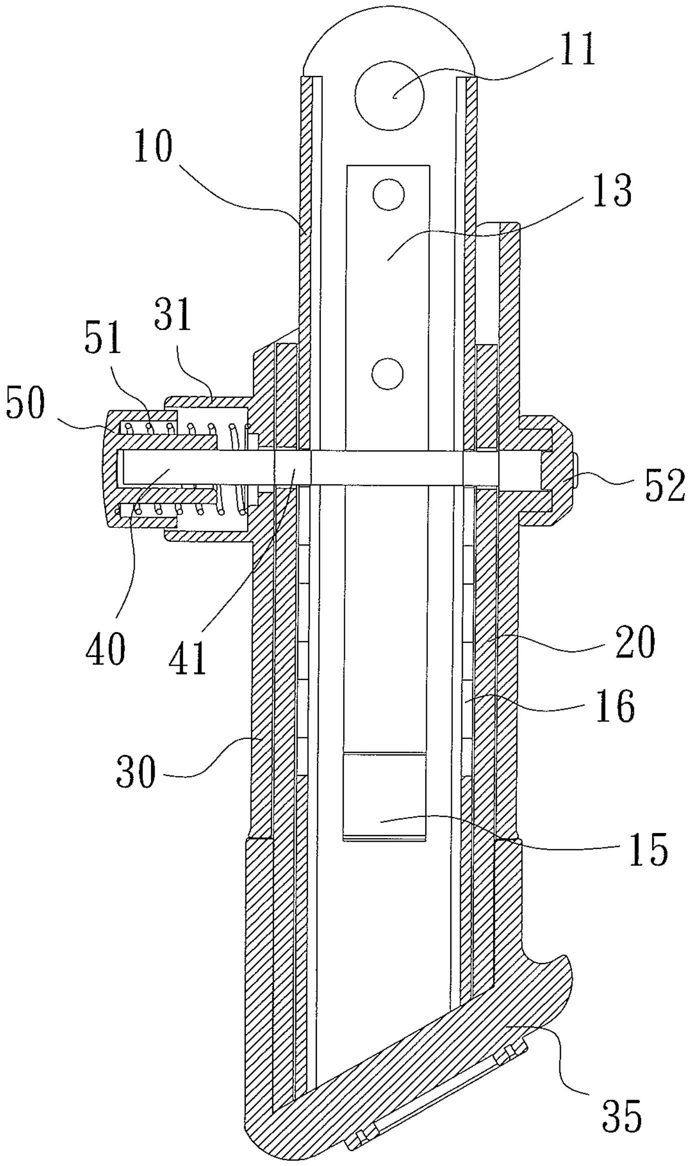
FIG. 6 is also another cross sectional view showing the operation of the post and the vertical moving unit of the booster structure of the legs according to the preferred embodiment of the present invention.
Figure 7:
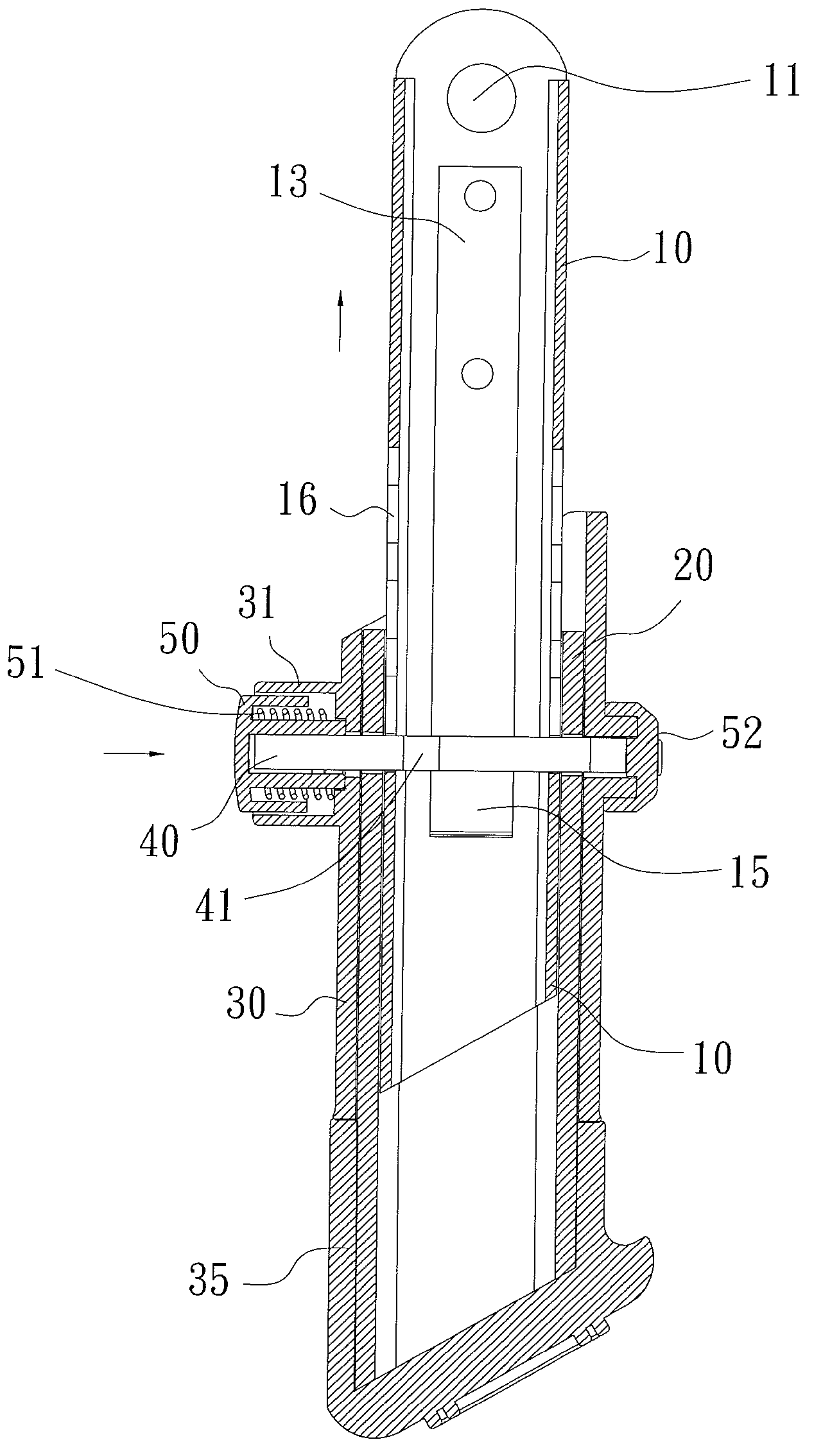
FIG. 7 is still another cross sectional view showing the operation of the post and the vertical moving unit of the booster structure of the legs according to the preferred embodiment of the present invention.

With reference to FIGS. 1-7, a booster structure of legs according to a preferred embodiment of the present invention includes a support plate 70 including four posts 10 disposed at four corners of a bottom end thereof respectively. Each post 10 includes a plurality of recesses 16 fixed on a predetermined side surface thereof. Each of the plurality of recesses 16 includes a vertical sliding section 17 and a number of horizontal retaining sections 18 perpendicular to the vertical sliding section 17. The post 10 also includes a limiting member 13 secured therein. The limiting member 13 includes an integrally twisted defining segment 15 formed on a bottom end thereof to limit a bolt element 40 to move vertically. The integrally twisted defining segment 15 includes at least two positioning portions 14 extending from a side surface thereof relative to a fixing portion 12 of the side surface of the post 10 and includes an axial segment 11 arranged on a top end thereof to be retracted on the support plate 70. The post 10 includes a retaining piece 60 disposed thereon to cover the recesses 16.

Each of a plurality of vertical moving units A includes an inner stem 20 and an outer stem 30. The outer stem 30 and the inner stem 20 include a first fixed segment 32 and a second fixed segment 22 fixed on two top rims thereof individually in response to the positioning portions 14 of the post 10. The outer stem 30 includes a bottom cover 35 arranged on a bottom end thereof so that the outer and inner stems 30, 20 slide to cover the post 10. The first and second fixed segments 32, 22 of the outer and inner stems 30, 20 are vertically limited by the positioning portions 14 of the limiting member 13. The outer stem 30 includes a first guide hole 31 and a second guide hole 33 secured at two predetermined positions thereof individually. The inner stem 20 includes two third guide holes 21 fixed thereon to correspond to the first guide hole 31 and the second guide hole 33 respectively so that the bolt element 40 is inserted and slides in the first guide hole 31, the second guide hole 33, and the third guide holes 2. The bolt element 40 includes a straight sliding section 42 and a number of engaging sections 41 perpendicular to the straight sliding section 42 so that the bolt element 40 engages with and slides in the recesses 16 correspondingly in a multi-section engaging and sliding manner. The bolt element 40 includes a resilient element 51 and a button 50 fixed on one end thereof. The bolt element 40 includes a lip 53 secured on one side thereof to cover the outer stem 30. The lip 53 includes a plurality of orifices 52, and the outer stem 30 further includes a locking section 34 with a screw aperture to correspond to the orifices 52 such that the lip 53 and the outer stem 30 are connected together by using a preset bolt. The button 50 is disposed on one side thereof so that the bolt element 40 is forced by the button 50 to slide horizontally and return to its original position.

When a user desires to move the vertical moving unit A of the support plate 70 upward and downward, the button 50 of the outer stem 30 is pressed to push the bolt element 40 to move backward. Hence, the engaging sections 41 of the bolt element 40 disengage from the retaining sections 18 of the recesses 16 of the post 10, and the straight sliding section 42 of the bolt element 40 is guided to slide in the vertical sliding section 17 of the recesses 16, thus adjusting the bolt element 40 vertically. Therefore, the vertical moving unit A is pulled by the user based on a required height to move upward and downward relative to the post 10. Thereafter, when the vertical moving unit A displaces toward a suitable position, the button 50 is released so that the bolt element 40 returns back to the original position. Hence, the engaging sections 41 are retained in the horizontal retaining sections 18 of the post 10 so that the vertical moving unit A is positioned at a desired position of the post 10.

Thereby, the booster structure of the legs is capable of being retracted, and the vertical moving unit A is moved toward a desired height smoothly by pressing the button 50 to be further fixed at multi-section positions with the post 10, operating the booster structure of the legs easily.

While various embodiments in accordance with the present invention have been shown and described, it is clear to those skilled in the art that further embodiments may be made without departing from the scope of the present invention.

What is claimed is:

1. A booster structure of legs comprising:

a support plate including four posts disposed at four corners of a bottom end thereof, wherein each post includes a hollow interior and first and second recesses defined in opposite side surfaces thereof, wherein each recess includes a vertical sliding section and a plurality of horizontal retaining sections perpendicular to the vertical sliding section;

a plurality of vertical moving units, each vertical moving unit including an inner stem and an outer stem, each outer stem including a bottom cover arranged on a bottom end thereof, the outer stem and the inner stem of each one of the plurality of vertical moving units slide over one of the four posts to cover that post;

a bolt element slidably inserted through a pair of aligned apertures defined in the inner stem and the outer stem of each of the plurality of vertical moving units respectively, each bolt element including a straight sliding section and an engaging section perpendicular to the straight sliding section, wherein the straight sliding section of each bolt element extends through the hollow interior of each post and engages with and slides through the vertical sliding section of the first and second recesses of each post, wherein the engaging section of each bolt element is movable between an original position with the engaging section being received in one of the plurality of horizontal retaining sections and an offset position with the engaging section being located in the hollow interior of each of the posts, wherein each bolt element further including a resilient element and a button fixed on one end thereof; and a lip secured on one side to each of the outer stem to cover at least a portion of each of the outer stem, wherein each button is disposed on another side of each of the outer stem opposite to the lip, and wherein each bolt element is forced by the button of that bolt element to slide horizontally to move from the original position to the offset position such that a portion of the bolt element is received in a recessed portion of the lip to allow each of the plurality of vertical moving units to be adjusted relative to each of the posts via sliding of the outer and inner stems of each of the plurality of vertical moving units on each post, and wherein each bolt is forced by each resilient element to return to the original position.

2. The booster structure of the legs as claimed in claim 1, wherein each post includes a limiting member secured in the hollow interior, wherein each limiting member includes an integrally curved segment formed on a bottom end thereof and includes at least two positioning portions extending from a side surface thereof, wherein each bolt element is received in the integrally curved segment, wherein each outer stem includes a first fixed segment defined on a top rim thereof and each inner stem includes a second fixed segment defined on a top rim thereof, wherein the inner and outer stems of each of the plurality of vertical moving units are restricted from sliding upwardly relative to each post via engagement of the first fixed segment and the second fixed segment with a portion of one of the at least two positioning portions extending through at least one opening defined in a sidewall of each post.

* * * * *